Nov. 10, 1936. N. K. CHANEY ET AL 2,060,035
METHOD OF MAKING PYRO-RESINS
Filed Sept. 14, 1932  2 Sheets-Sheet 1

INVENTORS
NEWCOMB K. CHANEY
WILBUR B. DEXTER
BY
ATTORNEY

INVENTORS
NEWCOMB K. CHANEY
WILBUR B. DEXTER
ATTORNEY

Patented Nov. 10, 1936

2,060,035

UNITED STATES PATENT OFFICE 2,060,035

METHOD OF MAKING PYRO-RESINS

Newcomb K. Chaney, Cleveland Heights, and Wilbur B. Dexter, Lakewood, Ohio, assignors, by mesne assignments, to Union Carbide and Carbon Corporation, New York, N. Y., a corporation of New York Application September 14, 1932, Serial No. 633,054

7 Claims. (Cl. 260—2)

This invention relates to resins formed by the pyrolysis of numerous plastic resins. It has special reference to the preparation of difficultly fusible resins which can be moulded under heat and pressure, whereupon they become relatively stable as compared with the materials from which the pyro-resins were formed. While in many of the examples given herein the plastic resin formed by the polymerization of vinyl compounds, e. g. acetates, chlorides, or mixtures of the two, will be referred to, it is to be understood that our invention is in no way limited to the use of vinyl resins but includes the phthalic anhydride and glycerine condensation products, cumaron resins, low melting point phenolic condensation products and others.

An object of our invention is the preparation of infusible or difficultly fusible pyro-derivatives of certain thermo-plastic resins, such as the vinyl resins and the others above mentioned. Another object of our invention is to deposit insoluble infusible pyro-resins in adherent continuous phase capable of functioning as impervious protective films, as bonding media in plastic compositions and as chemically resistant impregnating agents.

These and other objects of our invention will be evident from the following specification, having reference to the accompanying drawings in which Figs. 1 to 6 inclusive are curves showing the loss in weight of various substances during their thermal treatment.

The resins formed by the condensation and/or polymerization of organic compounds may be divided roughly into two classes. The first of these, typified by the high melting point phenolic-aldehyde resins, are not thermo-plastic, and give a high yield in the preparation of an infusible product. The other group, which includes the vinyl resins, "Glyptal", the cumaron resins and others, are thermo-plastic, have large weight losses upon conversion to an infusible product and have an increased thermal stability after conversion.

It has, in the past, been believed that the resins of the thermo-plastic group should not be subjected to high temperatures since the resulting product swelled, foamed or was distorted. We have found that if this heating be controlled and proper provision made to allow the gases formed during the heating to escape, new and valuable products are obtained.

Figure 1:
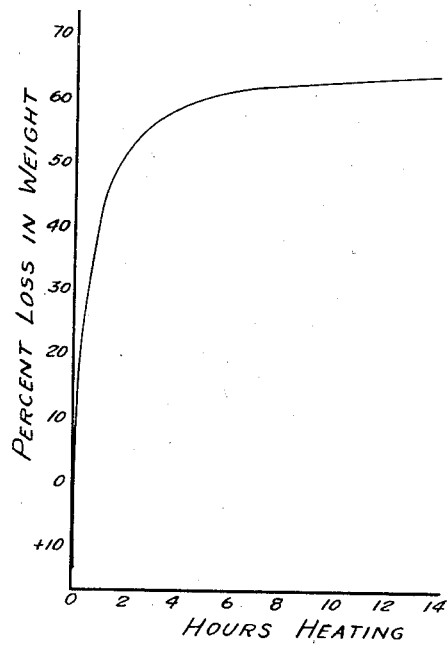
Figure 2:
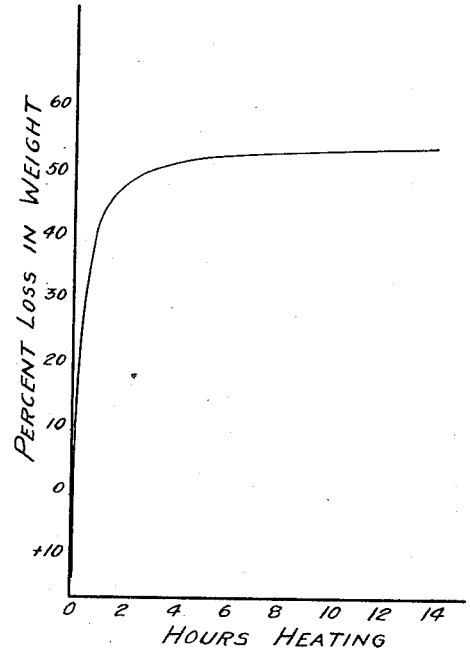
Figure 3:
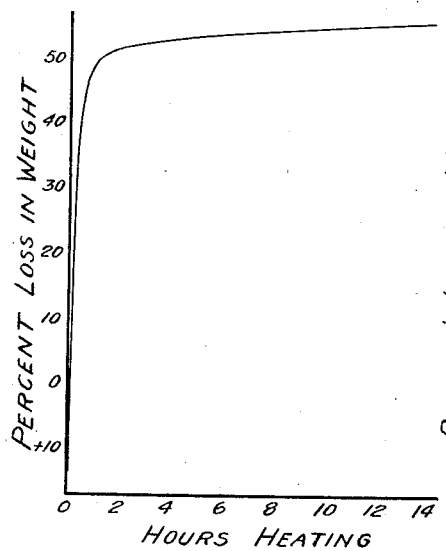
Figure 4:
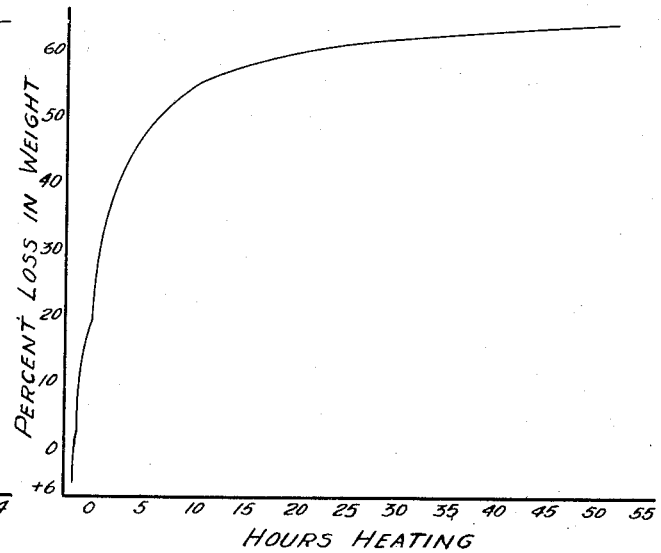
Figure 5:
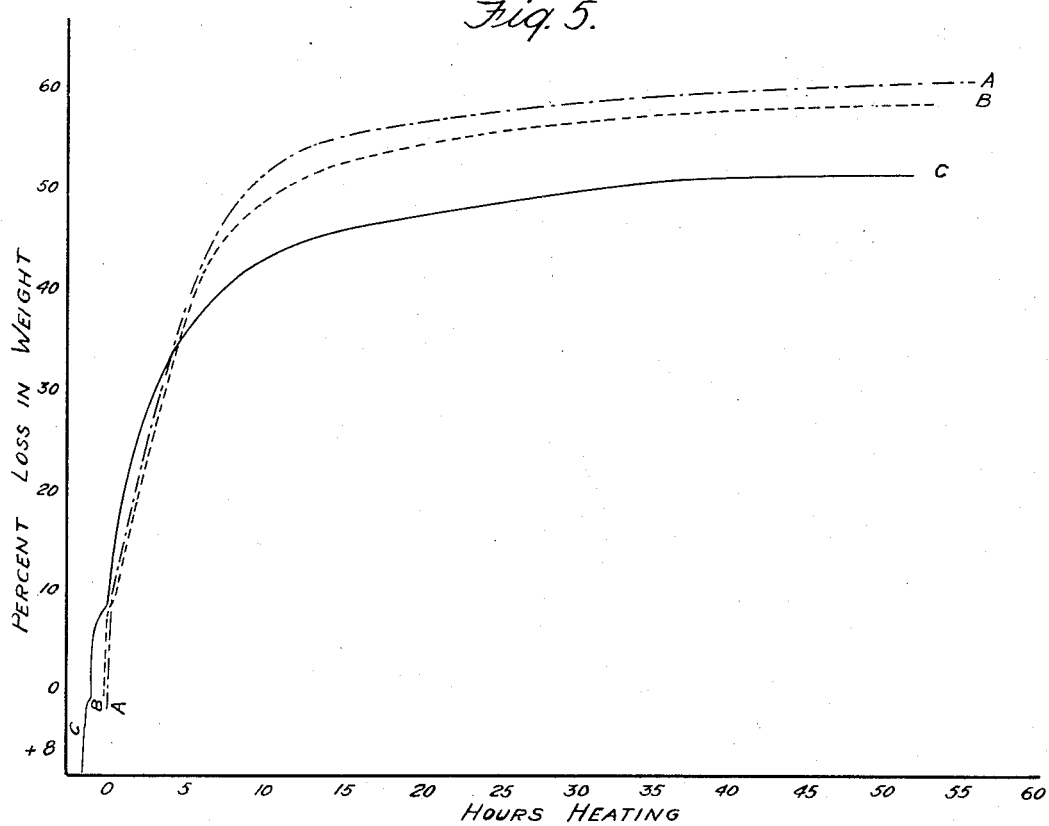
Figure 6:
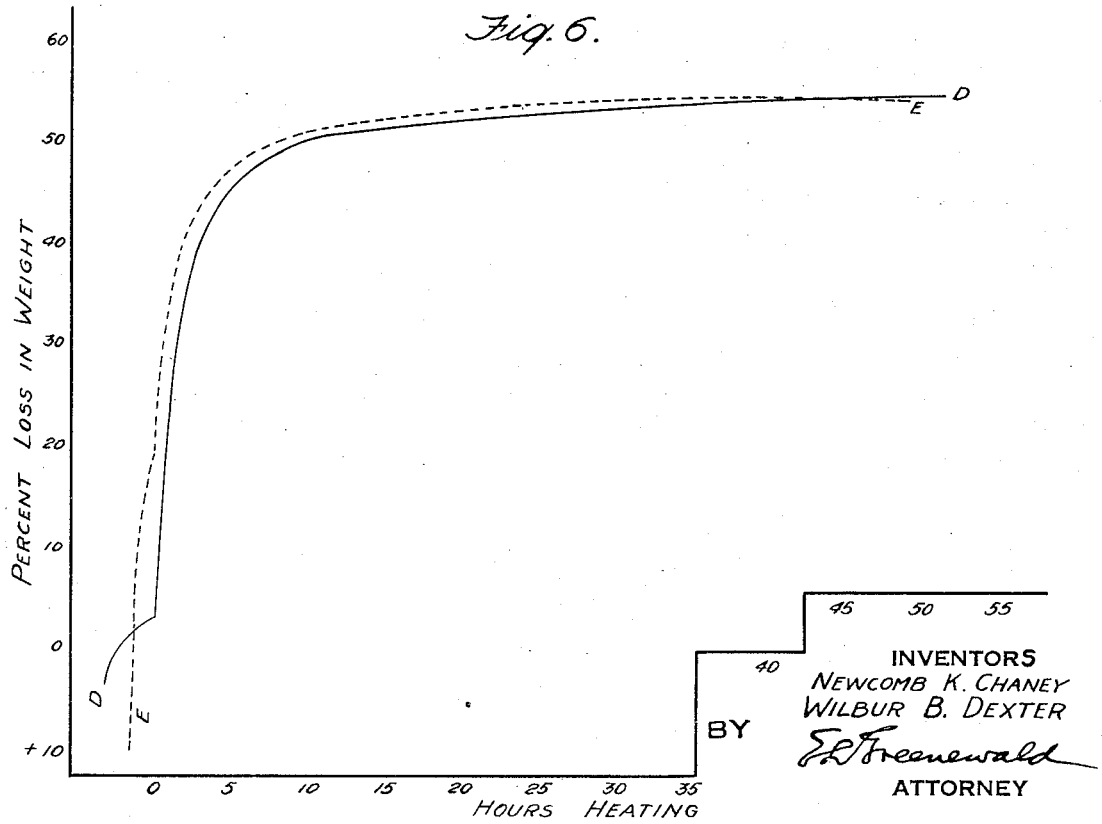

In the accompanying drawings the curves show the loss in weight of vinyl polymers upon heating. The abscissae represent time of heating in hours and the ordinates represent loss in weight in percent. Figures 1 to 3 represent the heat treatment of films containing 2% $FeCl_3$ at 225° C., Fig. 1 being for the resin formed by the polymerization of vinyl acetate, Fig. 2 for the resin formed by the polymerization of vinyl chloride and Fig. 3 for the resin formed by the conjoint polymerization of 4 parts vinyl chloride and 1 part vinyl acetate. Figures 4 to 6 represent the heat treatment at 200° C.; Fig. 4 being for a film composed of vinyl acetate resin with 1% $FeCl_3$; Fig. 5 being for vinyl chloride resin, curve A—A for the original powder treated with concentrated sulphuric acid, curve B—B for a dried film treated with concentrated sulphuric acid, and curve C—C for a film containing 1% $FeCl_3$; and Fig. 6 being for a resin formed by the conjoint polymerization of 4 parts vinyl chloride and 1 part vinyl acetate, curve D—D for a dried film treated with concentrated sulphuric acid and curve E—E for a film containing 1% $FeCl_3$.

We have found that in the heat conversion of resins of the thermo-plastic type it is important that the heating be gradual. If the heating be sudden a type of conversion occurs in which a greater part of the resin is volatilized, whereas more gradual and prolonged heating at lower temperatures will yield a continuous adherent phase which may be carried to higher temperatures with relative impunity. This transformation is always accompanied, in the case of the resins prepared from vinyl esters, by the evolution of free acid during the pyro-condensation.

In order to permit the thermal decomposition to proceed with reasonable velocity at lower temperatures and to facilitate the formation of the pyro-resins in continuous phase, with lessened tendency to shrinkage, rupturing and cracking, we have found the use of catalytic accelerators desirable. The most effective catalysts for this purpose are the chlorides of bismuth, iron and tin. Salts of such metals as zinc, aluminum, lead and the alkalis appear to promote thermal breakdown in many cases but exert undesirable effects, such as cracking and embrittlement, giving a mechanically weak product. The catalysts favorable to the formation of a strong pyro-resin appear to be limited to the salts of the metals which are somewhat soluble in the resin solvents employed. Under some conditions sulphuric acid has been found to be an effective catalyst for accelerating the condensation of the vinyl resins with heat, but there are difficulties in controlling its action which make it unsuitable for general use.

The curves shown in the figures illustrate the transition from thermally unstable, thermoplastic vinyl polymers to pyro-resins. The vertical portions of the curves show the actual transition while the horizontal portions show the thermal stability after the transition is complete. The curves given are for conversion in the presence of catalysts and the slope of the curve changes sharply. In the absence of a catalyst and at lower temperatures the same horizontal values are ultimately reached but the slope of the ascending curve is much more gradual. Analyses show that at or near the knee of these curves the elimination of the acetyl and chloride groups of the original vinyl polymer is substantially complete and also that an oxidation of the pyro-resin has usually been effected. The resins show an unsaturated character during the transition, possessing the property of readily decolorizing bromine water.

The ratio of carbon to hydrogen atoms found by analysis of the pyro-resins after various stages of heating varies from 4:3 to 4:5, averaging about 4:4. The atomic ratio of carbon to oxygen varies from 4:1 to 4:2. Accordingly the following general reaction is believed to approximately indicate the nature of the pyro-condensation:

$$(C_4H_5R_2)n + heat + oxygen \rightarrow (C_4H_4O_2)n + 2n(HR).$$

R indicates the acid radical of the vinyl resin. As shown by Figs. 1–6 the pyro-resin as such is not completely heat stable, but breaks up very slowly on prolonged heating at high temperatures; analyses indicate the loss of hydrogen and oxygen, giving a product having the approximate general formula $(C_4H_2O)n$. During this prolonged heating the resins shrink and crack and become black by reflected light; thin sections, however, still show a red color by transmitted light, indicating very considerable decomposition of the pyro-resin may occur before actual carbonization takes place.

The following table gives the comparative weight yields for complete conversion of thermo-plastic resins to the corresponding pyro-resins:

| Kind of resin | Temp. range | Time—hours FeCl₃ catalyst | | Weight yield pyro resin |
|---|---|---|---|---|
| | | 1% | 2% | |
| | °C. | | | Percent |
| Vinyl chloride | 200–225 | 35 | 6 | 48 |
| Vinyl acetate | 200–225 | 27.5 | 7 | 37 |
| Conjointly polymerized vinyl resins | 200–225 | 25 | 5 | 46 |
| | | No catalyst | | |
| "Glyptal" (dicarboxylic acid anhydride and glycerin) | 200–220 | 32 | | 46 |
| Cumaron | 200–275 | 30 | | 55–62 |
| Low melting phenolic | 100–200 | 1 | | 92 |
| High melting phenolic | 100–200 | 2 | | 91.4 |

The yield of pyro-resin from cumaron resin varies with the grade employed. Upon further heating the "Glyptal" and vinyl resins continue losing weight slowly but the phenolic resins gain in weight by taking up oxygen.

The losses of from 20 to 60% of the weight of the parent resin, which are necessary for the partial or complete pyro-conversion of the more stable thermo-plastic resins obviously involve certain difficulties due to the copious evolution of gas during the early stages of the condensation reactions while the resins are still in a fused thermo-plastic condition. Also the higher temperatures generally required for conversion and the greater weight losses accompanying the reactions greatly increase the tendency to shrinkage, cracking and mechanical failure of the residual pyro-resins on cooling. Hence the difficulties of obtaining such pyro-resin derivatives in continuous phase for use as impervious films or as bonding media in plastic molded articles have been almost insuperable when large masses of resin or high binder ratios are employed, in fact these difficulties have been sufficiently great to completely obscure the fact that a useful pyro-resin formation is possible in the case of the so-called thermo-plastic resins. When the disposal of large volumes of gaseous decomposition products is realized to be a condition precedent to the successful heat conversions of thermo-plastic resins of the vinyl and "Glyptal" types, it is obvious that modifications in the procedure may be devised which will permit of the utilization of these resins in somewhat larger masses or higher ratios than have hereto been practical. For example, an adsorbent for hydrochloric acid may be incorporated in the mix or higher pressures may be used to prevent bubble formation during condensation. Nevertheless, we believe that the preferred commercial applications of our new pyro-resin derivatives will lie in their use in thin films and in lower resin concentrations and that the commercial uses will depend upon the specific properties exhibited by such pyro-resins with respect to their mechanical strength, bonding power in low concentrations, chemical inertness and thermal stability.

As an example of the bonding power of these pyro-resins in low concentrations, brushes for electric machinery were made using various types of binders. The binders were mixed with graphite and ball milled for two hours and molded at pressures of 20 tons per square inch. The vinyl resin was made by the conjoint polymerization of 4 parts vinyl chloride and 1 part vinyl acetate. In the table below, the figures under "Fiber stress" are net values after a deduction representing the strength of molded graphite with no binder. The "Specific bonding power" is calculated by dividing the net fiber stress by the percentage of resin employed.

| Kind of resin | Percent resin | Baking temp. C. | Baked density | Fiber stress lbs/sq. inch | | Specific bonding power |
|---|---|---|---|---|---|---|
| | | | | Observed | Net | |
| Vinyl | 2.5 | 175 | 2.060 | 2650 | 1650 | 660 |
| Vinyl | 5 | 165 | 2.031 | 4220 | 3220 | 640 |
| Vinyl | 10 | 155 | 1.973 | 6180 | 5180 | 520 |
| "Glyptal" | 2.5 | 245 | 2.056 | 2610 | 1610 | 640 |
| "Glyptal" | 5 | 225 | 2.015 | 6130 | 5130 | 1025 |
| "Glyptal" | 10 | 145 | 1.966 | 6766 | 5766 | 580 |
| Phenolic low melting | 2.5 | 165 | 2.059 | 4110 | 3110 | 1240 |
| Phenolic low melting | 5 | 165 | 2.011 | 5400 | 4400 | 880 |
| Phenolic low melting | 10 | 165 | 1.914 | 7220 | 6220 | 620 |
| Phenolic high melting | 2.5 | 205 | 2.067 | 2150 | 1150 | 460 |
| Phenolic high melting | 5 | 205 | 2.024 | 2550 | 1550 | .620 |
| Phenolic high melting | 10 | 205 | 1.953 | 4280 | 3280 | 330 |

This table shows that the specific bonding power of these resins is much higher in relatively low concentrations, i. e. concentrations below those heretofore used in the formation of brushes, said low melting phenolic resins in the past have been considered unsatisfactory for brush bonding in the usual binder ratios. We have found that the pyro-resins formed from low melting phenolic resins as well as the other pyro-resins described herein show a continuous increase in specific bonding power in ratios below 10%.

The following is an example of a method of employing our invention in the production of carbon articles for use in the chemical industry. The carbon article as a vessel or tube is heated to 100° C. and dipped in a 5% solution of a resin fromed by the polymerization of vinyl chloride, the solvent being ethylene dichloride, and FeCl₃ equivalent to 1% by weight of the resin is added to the solution. The carbon article is dried rapidly in air and then placed in an oven at 125° to 135° C. for thirty minutes. The process is then repeated, in some cases a third repetition may be employed. After the second or third cycle as above a final heating at 200° C. for ten minutes is given. In case it is desired to coat an article which has been impregnated by some other method the amount of resin required is exceedingly small, often less than 1% by weight of the carbon article.

We claim:

1. Method of forming a difficultly fusible, relatively insoluble pyro-resin which comprises heating a thermo-plastic vinyl ester resin slowly in the presence of a chloride of the group of metals bismuth, iron and tin as a catalyst.

2. Method of forming a difficultly fusible, relatively insoluble, pyro-resin which comprises the step of slowly heating a vinyl ester resin in the presence of ferric chloride.

3. Method of forming a difficultly fusible, relatively insoluble, pyro-resin which comprises heating a polymerized vinyl ester resin, at temperatures of from 200 to 250° C. in the presence of a catalyst selected from the group consisting of bismuth chloride, iron chloride and tin chloride until the resulting resin is relatively heat stable.

4. Method of preparing an insoluble infusible resin in continuous phase which consists in the thermal condensation of soluble thermo-plastic vinyl ester polymers in the presence of ferric chloride.

5. Process of forming difficultly fusible, relatively insoluble pyro-resins which comprises heating a thermo-plastic vinyl ester polymer at temperatures of from 200° to 225° C. from 5 to 7 hours in the presence of 2% of ferric chloride.

6. Process of forming difficultly fusible relatively insoluble pyro-resins which comprises heating a vinyl ester polymer at temperatures of from 155° to 225° C. in the presence of a chloride of the group of metals bismuth, iron and tin as a catalyst until at least 20% of said polymer has been eliminated in the form of an acid.

7. The method of forming insoluble infusible pyro-resins which comprises the slow thermal decomposition and condensation of a low melting thermo-plastic vinyl ester resin in the presence of a chloride of the group of metals bismuth, iron and tin as a catalyst at a temperature above the melting point of the thermo-plastic resin, such condensation being characterized by a substantial loss in weight.

NEWCOMB K. CHANEY.
WILBUR B. DEXTER.